Dec. 18, 1962     J. E. PRESS ET AL     3,069,105
PLASTIC DISPENSER AND METHOD OF MAKING IT
Filed March 5, 1957

INVENTORS:
John E. Press and
Albert Safianoff,
BY Smith, Olsen, Baird & Miller
ATTORNEYS.

United States Patent Office 3,069,105
Patented Dec. 18, 1962

3,069,105
PLASTIC DISPENSER, AND METHOD OF
MAKING IT
John E. Press, Niles, and Albert Safianoff, Chicago, Ill.,
assignors to Fedco Corporation, a corporation of Illinois
Filed Mar. 5, 1957, Ser. No. 644,103
9 Claims. (Cl. 242—55.2)

This invention relates to a fastener assembly, and to a method of making the same and establishing a fastening or connection thereby. The assembly may be embodied, for example, in a rider-roll tape dispenser, and the connection made in mounting the assembly on a tubular roll of tape.

There are numerous examples of devices that must be connected one-to-another or fastened in some manner to the apparatus with which they are used. While machine fastening operations are for the most part rapid and relatively inexpensive, there are many occasions where such fastening operations cannot be employed. It then becomes necessary to rely on hand or manual assembly and fastenings which are time-consuming because of the multiple components that must usually be handled, and therefore costly. In a rider-roll dispenser, for example, which is used in dispensing selected lengths of tape from a tubular roll, the dispenser must be first mounted upon the roll and secured in position by means of a fastener (such as a nut and bolt) that extends between wall portions thereof and through the open center of the tubular roll. Thus, multiple operations are required in that the dispenser is first positioned on the roll, a bolt inserted through openings in the spaced walls of the dispenser, a nut threaded onto the bolt, and the nut thereafter tightened.

Today, plastics are in extensive use, and certain devices and articles may be made advantageously therefrom. Conventionally however, these devices, when they must be fastened one-to-another or connected to the structure with which they are used, have the same disadvantages in that respect as the devices and articles heretofore referred to in that traditional fastening means are used therewith. This applies, for instance, to rider-roll tape dispensers though they may be made of plastic, for they must still be secured to the tubular roll of tape in the customary manner. We have discovered an improved type of fastener assembly especially suited for use with molded plastics, and the provision of such improved assemblies is one of the objects of this invention.

Another object of the invention is that of providing a method of making fastener assemblies, and of establishing connections thereby. Still another object is to provide a plastic article having a fastener pin molded integrally therewith in such a manner that a force of sufficient magnitude applied to the pin, fractures its integral connection with the device and extends it into a relation of connection therewith.

Yet another object is that of providing a plastic tape dispenser or the like having spaced walls, one of which is reduced in thickness to define a frangible web or membrane formed integrally with an elongated pin projecting laterally therefrom, and the other wall having an opening aligned with the pin for frictionally receiving the same therein—such device being characterized by the fracturability or rupturability of the web when a force (an impact blow, for example) is applied to the pin thereby permitting the pin to be embedded in the opening, with the result that it establishes a connection or fastening between the walls.

A further object is in a method of connecting a pair of plastic members, which includes the steps of molding one of the members with a relatively thin, frangible web integral with an elongated pin extending outwardly therefrom, and molding the other member with an opening therein, rigidly constraining the molded members with the pin and opening in alignment, and thereafter delivering a blow to the pin to fracture the thin web and embed the pin in the opening. Additional objects and advantages, including details in those set forth above, will become apparent as the specification develops.

An embodiment of the invention is illustrated in the accompanying drawing, in which—

Figure 1:
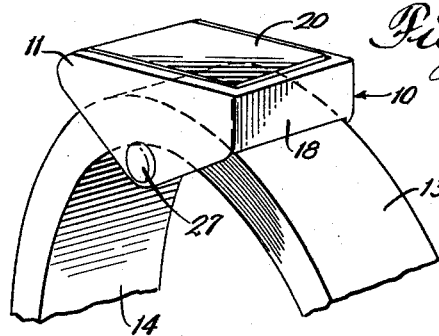
FIGURE 1 is a perspective view of a rider-roll tape dispenser shown in position on a tubular roll of tape.
Figure 2:
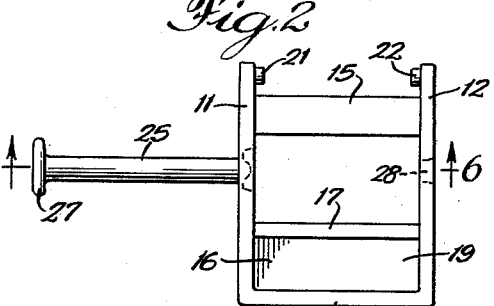
FIGURE 2 is a top plan view of the dispenser illustrated in FIGURE 1, with the pivotal cover knife removed.

The fastener assembly of this invention is exemplified in the drawing by its embodiment in a rider-roll tape dispenser designated in its entirety with the numeral 10. The dispenser 10 has spaced apart walls or skirts 11 and 12 that are in substantially parallel relation and are adapted to span a tubular roll of tape 13 having a central opening 14 therethrough. As is evident from FIGURE 1 the walls 11 and 12 have depending ears or wall portions aligned with the central opening 14 when the dispenser is positioned on the roll 13.

Figure 4:
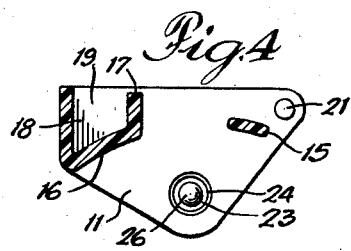
FIGURE 4 is a vertical sectional view taken along the line 4—4 of FIGURE 3.
Figure 3:
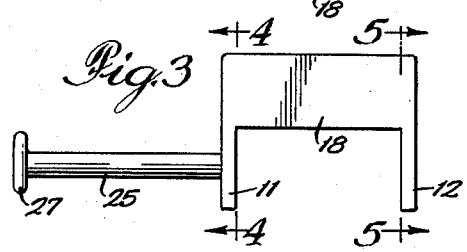
FIGURE 3 is an end view in elevation of the dispenser.
Figure 5:
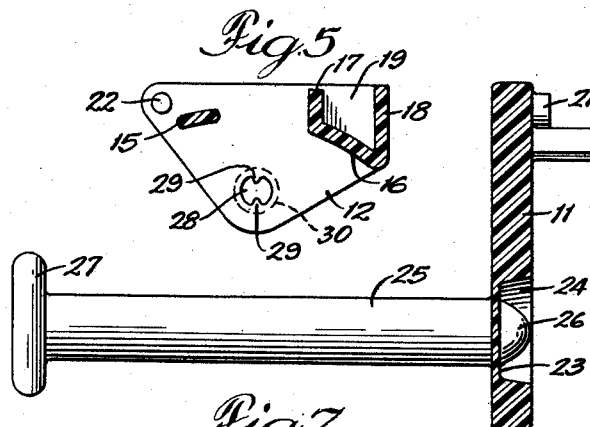
FIGURE 5 is a vertical sectional view taken along the line 5—5 of FIGURE 3.

The walls 11 and 12 are rigidly constrained with respect to each other, as by the respective securance thereof to a frame represented by the transversely extending frame members 15 and 16. These frame members serve an additional function in the tape dispenser, and as is seen in FIGURES 4 and 5 lie along an arc that generally corresponds to the circumference of the roll 13, and these frame elements ride along the circumferential surface of the roll. The frame member 15 serves as a guide, and the member 16 (having spaced inner and outer walls 17 and 18, respectively, that define a compartment 19 therebetween) cooperates with a cover knife or blade 20 in severing a length of tape from the roll 13. After severance, the end of the tape will be adjacent the compartment 19 so that it can be grasped readily by the fingers when the cover knife 20 is pivoted upwardly about the axis defined by the bearing projections 21 and 22 on which the cover is mounted. Insofar as concerns the instant invention, the cover knife 20 has no application per se, and therefore it has been omitted from the illustrations of FIGURES 2 through 7 to simplify the same.

Figure 6:
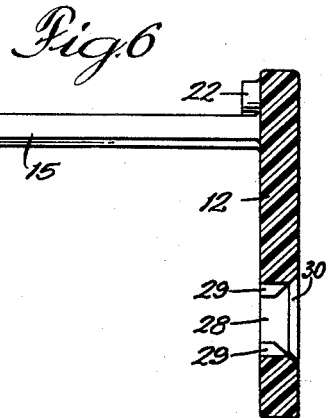
FIGURE 6 is a transverse sectional view as seen along the line 6—6 of FIGURE 2, and showing the fastener pin in its extended position as the dispenser is molded and before the mounting thereof on a roll of tape.

Referring now to FIGURE 6 in particular, it is apparent that the wall 11 has formed therein a relatively thin web or membrane 23 that is frangible or fracturable. The web 23 is defined by an area of reduced thickness in the wall 11 which provides an annular recess 24 therein. Held by the web 23 is an elongated fastener or pin 25 that projects laterally from the wall 11 and is substantially normal to the plane thereof. At one end, the pin 25 adjacent and inwardly of the web 23 is rounded as shown at 26; and at its outer end, it is equipped with an enlarged head 27 that is greater in width than the width of the web 23 and also greater than the annular recess 24.

The wall 12 is provided with an opening 28 therethrough aligned with the pin 25, and preferably with one or more ribs 29 extending into the opening 28. In the specific illustration, there are two ribs 29 oriented with respect to each other at opposite ends of a diameter of the opening 28. It will be noted that the opening 28 is countersunk or enlarged along the outer side of the wall 12, and such enlargement is identified with the numeral 30. The ribs 29 terminate adjacent the inner edge of the enlargement 30, and taper theretoward along their rear edge so as to terminate in effect at substantially the center of the wall 12.

Figure 7:
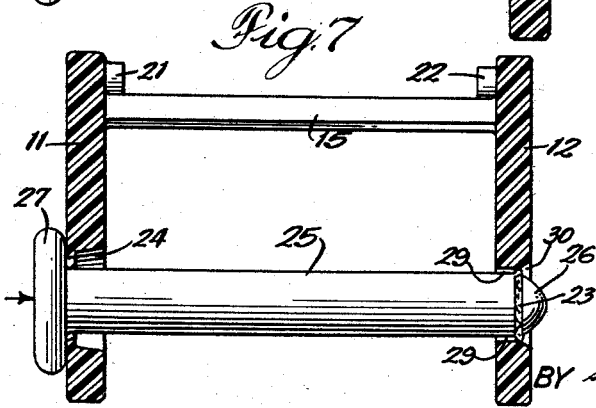
FIGURE 7 is a transverse sectional view identical to that of FIGURE 6, but showing the pin in its fastening position.

It will be evident from FIGURE 7 that when a force is applied to the pin 25 along the longitudinal axis thereof toward the wall 12, and more especially toward the opening 28 therein, the thin web 23 will fracture— assuming that the force has sufficient magnitude to accomplish that result—and upon such fracture of the web, the pin is free to move across the space defined between the walls 11 and 12 and to project its rounded end or nose 26 into the opening 28. The distance between the ribs 29 is less than the diameter of the pin 25 so that the pin becomes embedded in the opening 28 and is frictionally held therein. A comparison of FIGURES 6 and 7 indicates that the ribs 29 deform or become embedded in the pin 25.

A portion of the fractured membrane 23 is carried by the pin into the opening 28, and the dimensional relation of the pin with respect to the walls is such that the membrane fragments carried by the pin are oriented behind the ribs 29 and adjacent the enlargement 30 of the opening 28 when the head of the pin is abutting the outer surface of the wall 11. Thus, the web fragments aid in anchoring the pin within the opening 28. The driving force ordinarily applied to the head of the pin to fracture the web and embed the pin in the opening 28, may be provided by a hammer-like blow delivered thereto. Since the rounded nose 26 of the pin extends outwardly slightly from the wall 12 when the pin is embedded in the opening 28 thereof, the pin can be loosened and removed by striking the nose with a similar hammer-like blow.

When the fastener apparatus described is embodied in a dispenser 10, the dispenser is readily mounted on a tubular roll of tape 13 by inserting the roll between the spaced walls 11 and 12, and then driving the pin 25 through the central opening 14 in the roll to break or fracture the web 23 and embed the pin in the wall opening 28 as hereinbefore described. The dispenser is thereby secured to the roll 13 and is free to ride thereon. If for any reason the dispenser need be removed from the roll 13 before the depletion thereof, this is accomplished in the manner described by striking the nose 26 of the pin to remove it from the frictional grip of the ribs 29.

The dispenser device is a molded plastic unit that may be formed, for example, from polystyrene or other suitable plastics preferably having high impact properties. The membrane 23 is provided as an integral part of the wall 11 in the molding thereof by suitably reducing the wall thickness, and in this same operation the pin 25 is molded integrally with the web. Similarly, the opening 28 and ribs 29 are made in the wall 12 during the molding thereof. The walls 11 and 12 are formed integrally with the frame members 15 and 16 in the same molding operation wherein the walls 11 and 12 are made. Thus, the entire assembly is provided in a single molding operaiton, complete with its own fastener pin which thereafter may be properly positioned by simply striking the head thereof to rupture the web and embed the pin end portion in the opening 28.

It will be apparent from the foregoing description of the invention, which has been primarily in structural terms, that a method of making a fastener assembly has also been described as well as a method of establishing a fastening or connection thereby, wherein a pair of plastic members (such as the walls 11 and 12 of the dispenser) are molded such that one of the members has an area of reduced thickness therein defining a frangible web integral with an elongated pin extending outwardly therefrom, and the other members so molded with an opening therein—these molded plastic members being rigidly constrained with respect to each other in a position such that the pin and opening are in alignment, whereby a force of sufficient magnitude applied against the pin in the direction of the opening fractures the web and embeds the pin in the opening to establish the connection between the two plastic members.

While in the foregoing specification an embodiment of the invention has been set forth in considerable detail with reference to a method of forming and the structure produced thereby, it will be apparent to those skilled in the art that numerous changes may be made in those details without departing from the spirit and principles of the invention.

We claim:

1. In a plastic dispenser for tubular roll tape and the like, a pair of spaced apart walls rigidly constrained with respect to each other and adapted to span a tubular roll of tape and with wall portions thereof in alignment with the central opening through the tubular roll, one of such wall portions having an integral frangible web, and an elongated pin of greater length than the spacing between said walls formed adjacent an end thereof integral with said web and extending laterally from that wall, the other of such wall portions having an opening therein aligned with said pin for frictionally receiving the same therein, said web being fracturable to release said pin when a force of appropriate magnitude is applied thereagainst thereby enabling the pin to be embedded in said opening.

2. In a plastic dispenser or the like, a pair of spaced apart, substantially parallel walls relatively rigid with respect to each other and adapted to span a tubular roll of tape having a central opening therethrough, each of said walls having a portion thereof in alignment with the opening through such tubular roll when the walls are spanning the same, one of such wall portions being provided with a frangible web, and an elongated pin of greater length than the spacing between said walls and being equipped at one end with an enlarged head and secured adjacent its other end to said web, the other of such wall portions having an opening therein aligned with said pin for frictionally receiving the same therein when the pin is driven thereinto following a fracture of said web.

3. The structure of claim 2 in which said wall opening has a plurality of spaced ribs extending radially thereinto for engagement with said pin when the latter is driven into the opening.

4. In a plastic device of the character described, a frame and a pair of spaced apart walls all formed of plastic and molded integrally with each other, one of said walls having an integrally molded frangible web defined by an area of reduced thickness therein, and an elongated pin of plastic molded adjacent an end thereof integral with said web, said pin extending outwardly from said web in a substantially normal orientation with the plane of the web-equipped wall and having at its outer end an enlarged head of greater width than that of said web, the other of said walls being provided with an opening therein aligned with said pin and adapted to frictionally receive the same therein, said pin having a length greater than the spacing between said walls to permit the pin to be extended thereacross with an end portion thereof positioned in said opening when the head of the pin is substantially contiguous with the plane of the web-equipped wall, said web being characterized by its fracturability when said head is impacted by a blow delivered along the longitudinal axis of the pin.

5. The structure of claim 4 wherein said opening is provided with a plurality of ribs extending radially inwardly thereof and adapted to be embedded in said pin.

6. The structure of claim 4 wherein the end portion of said pin adjacent said web has a reduced cross section to facilitate entry thereof into said opening, the length of said pin being such that the reduced end portion thereof projects outwardly from the opening-equipped wall when the head of said pin is substantially contiguous with the web-equipped wall.

7. The structure of claim 6 wherein said opening is provided with a plurality of spaced apart ribs extending inwardly thereof, said ribs terminating at their inner ends intermediate the surfaces of the opening-equipped wall, whereby web fragments carried by said pin when the same is embedded in said opening become located substantially adjacent the inner ends of said ribs.

8. In a method of connecting a pair of molded plastic members, the steps of molding said members one with an area of reduced thickness defining a frangible web integral with an elongated pin extending outwardly therefrom and the other with an opening therein adapted to tightly receive said pin therein, rigidly constraining said members with the pin and opening in substantial alignment, and applying force against said pin in the direction of said opening of a magnitude great enough to fracture said web and embed said pin in said opening.

9. The method of pinning together a pair of plastic members, comprising the steps of molding one of said members with an area of reduced thickness therein defining a frangible web having an elongated pin integral with the web and extending outwardly therefrom, providing an opening in the other member at a position in alignment with the axis of the pin, and then striking the pin to fracture said web and drive the pin into the opening.

References Cited in the file of this patent

UNITED STATES PATENTS

| | | |
|---|---|---|
| 2,206,212 | Wainwright et al. | July 2, 1940 |
| 2,670,042 | Isler | Feb. 23, 1954 |
| 2,674,417 | Behr | Apr. 6, 1954 |
| 2,724,867 | Smith | Nov. 29, 1955 |
| 2,847,754 | Woodward | Aug. 19, 1958 |